United States Patent [19]

Starmer

[11] Patent Number: 5,115,652
[45] Date of Patent: May 26, 1992

[54] MOTOR VEHICLE ANTI-THEFT DEVICE

[75] Inventor: John E. Starmer, Colegate, United Kingdom

[73] Assignee: Metro Products (Accessories & Leisure) Ltd., Oxted, United Kingdom

[21] Appl. No.: 688,620

[22] PCT Filed: Nov. 23, 1990

[86] PCT No.: PCT/GB90/01825
§ 371 Date: Jun. 14, 1991
§ 102(e) Date: Jun. 14, 1991

[87] PCT Pub. No.: WO91/08127
PCT Pub. Date: Jun. 13, 1991

[30] Foreign Application Priority Data

Nov. 25, 1989 [GB] United Kingdom ............... 8926674
Aug. 25, 1990 [GB] United Kingdom ............... 9018727

[51] Int. Cl.⁵ .............................................. B60R 25/02
[52] U.S. Cl. ............................................ 70/209; 70/226
[58] Field of Search ............. 70/209, 211, 212, 225, 70/226, 237, 238, 239

[56] References Cited

U.S. PATENT DOCUMENTS

| | | | |
|---|---|---|---|
| 3,742,743 | 7/1973 | Stoyanovitch | 70/209 |
| 4,134,282 | 1/1979 | Callahan | 70/212 |
| 4,304,110 | 12/1981 | Fain | 70/209 |
| 4,823,573 | 4/1989 | Latta | 70/209 |
| 4,970,884 | 11/1990 | Solow | 70/209 |

FOREIGN PATENT DOCUMENTS

| | | | |
|---|---|---|---|
| 2718291 | 10/1978 | Fed. Rep. of Germany | 70/211 |
| 1108874 | 4/1968 | United Kingdom | 70/212 |

Primary Examiner—Renee S. Luebke
Assistant Examiner—D. M. Boucher
Attorney, Agent, or Firm—Dennison, Meserole, Pollack & Scheiner

[57] ABSTRACT

A vehicle anti-theft device comprises a steering immobilizing bar (4) extending from a fastener (5). The bar (4) follows from the fastener (5) a path which undergoes directional change so that the device can be secured by the fastener to a portion of a steering wheel rim with the bar extending from the fastening means, over the steering wheel hub and then through the wheel, leaving an end portion of the bar projecting from behind the steering wheel rim.

8 Claims, 3 Drawing Sheets

MOTOR VEHICLE ANTI-THEFT DEVICE

BACKGROUND OF THE INVENTION

This invention relates to anti-theft devices for locking onto a car steering wheel to prevent or limit its movement.

Vehicle anti-theft devices are known in the form of a steering immobiliser bar having means by which it can be locked onto a vehicle steering wheel in a position in which a part of the bar projects from the wheel so that its movement is obstructed by encounter of the bar with a fixed part of the vehicle.

Some of the devices of that form comprise a bar in two telescopically slidable sections which have retaining hooks for engagement with diametrically opposed portions of a steering wheel rim. In order to fit the device, the bar is positioned against the steering wheel and then extended to bring both retaining hooks into engagement with the wheel rim, and the bar sections are then locked together (see e.g. United Kingdom Patent 1127524). The nature of these manipulations deters some drivers from making habitual use of such a device when leaving their cars. Moreover there is a risk of the devices being locked without being properly engaged with the steering wheel.

U.S. Pat. No. 4,134,282 discloses a steering immobiliser comprising an L-shaped member with a fastening device fitted near the junction of the two limbs of the L. The immobiliser is designed for fastening onto a steering wheel rim at the top of the wheel so that one limb of the L-shaped member extends downwardly across the wheel while the other limb extends over the wheel and overlaps the top edge of the dashboard or instrument panel. An immobiliser of this design has merely to be bodily placed in correct position on the steering wheel before being fastened. However this advantage is achieved at the cost of less versatility. The form and dimensions which the immobiliser must have in order that it can be fitted in the intended manner would make it unsuited to more than a limited range of motor car models. Moreover, in order that the immobiliser can be fitted to flat as well as to dished steering wheels, provision has to be made for moving the fastening device from one position to another on the L-shaped member. A further disadvantage is that when the immobiliser is fitted to a flat steering wheel a limb of the L-shaped member can be used as a long lever arm to subject the immobiliser to very strong forces which may deform or break it.

SUMMARY OF THE INVENTION

The foregoing discussion of prior art auxiliary anti-theft devices comprising a steering immobiliser exposes a problem facing designers of such products. The problem is to design a device which is suited to a wide range of different car models, which is simple to fit in working position, which is difficult to neutralise, and which is reasonably compact. Compactness is in practice quite important, not only from the standpoint of car users, who find some of the commercially available products cumbersome and inconvenient to stow in the vehicle, but also from the marketing standpoint, given the appreciable cost of good quality, attractive packaging.

The present invention contributes to a solution to this problem.

According to the present invention, there is provided an anti-theft device for preventing theft of a vehicle, comprising a steering immobiliser bar having fastening means by which it can be locked onto a vehicle steering wheel rim in a position such that a free end portion of the bar projects from the wheel to obstruct steering by encounter with a fixed part of the vehicle, which device is characterised in that the fastening means is located at one end of the said bar and the bar extends from that fastening means along a path which undergoes directional change such that the bar can bridge over a steering wheel hub which projects through the front plane of the steering wheel rim, and pass through the wheel at a position beyond that hub, so that a said free end portion of the bar projects from behind the wheel.

It has been found that the said directional change feature makes it possible to provide an anti-theft device which has a very advantageous combination of properties. In particular, it is possible to realise a greater versatility of use for given overall dimensions of the device. In regard to versatility, consideration is here given to the capacity of the device to be fitted in different orientations relative to a steering wheel, and to the variety of steering wheel designs and driving compartment layouts which can be catered for by a device of given shape and dimensions.

It is self-evident that a device according to the invention can be fitted not only to steering wheels having a hub which projects through the front plane of the wheel rim, but also to flat and dished steering wheels in which the top of the hub lies in or behind that plane.

The principle of the directional change feature is illustrated in FIG. 1 of the accompanying drawings, which figure is purely diagrammatic. The figure represents in broken lines a vehicle steering wheel W. FP is the front plane of the wheel rim. The hub H of the wheel projects through this front plane. An anti-theft device comprises a bar 2 at one end of which there is a fastening means 3 by which the device can be locked onto a portion of the rim of the steering wheel. From the fastener 3 the bar follows a path which undergoes directional change so that the anti-theft device can be fitted in a position as shown in which the bar bridges over the hub H and passes through the wheel at a position beyond the hub. A free end portion of the bar projects from behind the wheel. The direction in which this free end portion projects depends on another feature of the bar shape as hereafter referred to.

It will be apparent that the range of hub geometries which can be bridged depends in part on the height h of the central portion of the bridge formed by the device when it is fitted to a steering wheel of a given diameter and the top face of the bar is in contact with the wheel rim at a position diametrically opposed to the fastening means, and in part on the extent of the variations (if any) in the bridge height which occur when the device is fitted to steering wheels of the different diameters which are to be found in practice.

In preferred embodiments of the invention the path followed by a first portion of the bar, extending from the fastening means, is such that it forms a bridge whose central height is at least 3 cm, such height being measured from a straight notional base line extending from the axis of the wheel rim receiving passage through said fastening means to a point on the bar which is at a straight line distance of 36 cm from that axis. The dimension 36 cm is taken as an approximate mean value of the commonly encountered steering wheel diameters. In the diagrammatic FIG. 1, the axis of the wheel rim receiving passage through the fastening means runs perpendicularly to the plane of the drawing and is represented by the point a. For convenience, the axis of the wheel rim receiving passage through the fastening means is hereafter alternatively referred to as "the fastener axis". Anti-theft devices complying with the foregoing shape condition are particularly suitable having regard to the range of steering wheel sizes and designs to be found in most of the present day volume production motor cars.

In preferred embodiments of the invention, the path of the bar undergoes a directional change for forming a said bridge and then undergoes a reverse directional change so that when the anti-theft device is fitted to a steering wheel, the free end portion of the bar is nearer to the rear plane of the steering wheel rim than would otherwise be the case (i.e. in the absence of the reverse directional change). It has been found that this reverse directional change feature additionally promotes the object of making a steering immobiliser which is suitable for use in a wide variety of car models yet which is of reasonably compact form.

The bar 2 represented in full line in FIG. 1 exhibits this reverse directional change feature, 2a being the free end portion of the bar. The device can be fitted to a steering wheel of a given car with the free end portion projecting from the top, bottom or one side of the wheel, depending on the positioning of adjacent fixed parts of the car. For example, the device can be secured in a position such that steering is prevented by abutment of the said projecting free end portion of the bar against the windscreen, the dashboard, the driver's door or seat, or any person occupying that seat.

It is particularly advantageous for a free end portion of the bar remote from the fastening means to be substantially straight and for the bar to undergo a said reverse directional change such that when the immobiliser device is in position on a steering wheel and the top face of the bar is in contact with the steering wheel rim at a position diametrically opposite the fastening means, the said free end portion of the bar makes with the rear plane of the steering wheel rim an included angle (angle $\alpha$ in FIG. 1) of between 0° and 20°. The said free end portion of the bar is preferably parallel or substantially parallel with said rear plane. In the case that said angle $\alpha$ is not zero, the said free end portion of the bar may extend forwardly or rearwardly from that rear plane. In the case of any such immobiliser device, its overall length should preferably be such that when fitted to a steering wheel as just described, the end portion of the bar which projects from behind the steering wheel rim has a length of at least 15 cm. Given that the preceding part of the bar should be long enough to bridge the diameter of the larger steering wheels commonly to be found in conventional volume production cars, the device preferably has an effective overall length (measured along a straight line from the fastener axis to the remote end of the bar) of at least 53 cm. However, the versatility of the immobiliser and of course the convenience with which it can be handled and stowed, is adversely affected by excessive length. For suiting a wide variety of cars, it is unnecessary for the said effective overall length of the device to exceed 60 cm.

The invention includes devices wherein the bar is shaped so that the anti-theft device can be fitted to a car steering wheel in a position in which it is locked onto a bottom region of the steering wheel rim and the free end portion of the bar, which projects from behind the wheel rim, projects forwardly towards the vehicle windscreen and overlaps the top of the car instrument panel or dashboard. The free end portion of such a bar can for example follow a path 2b as shown in broken line in FIG. 1. In the absence of a reverse directional change in the path of the bar, the device cannot have quite such a high versatility in relation to its size. There are vehicles for which an immobiliser designed to cooperate with the top of a vehicle instrument panel or dashboard would be unsuitable, for example because the vehicle's instrument dials are located on a pod which would not prevent the steering wheel from being turned with the immobiliser attached. Moreover the shape of the device tends to make it less conveniently stowable. Nevertheless, devices having a bar without the reverse directional change, like other devices according to the invention, are easy to fit and, by virtue of the passage of the bar over the wheel hub and through the wheel, there is little or no risk of the immobiliser being rendered ineffective by force, using the bar itself as a lever.

The bar of a device according to the invention may for example be formed by a metal strip or rod.

The fastening means for securing the anti-theft device to the rim of a steering wheel can for example be in the form of a cuff having hingewise connected parts for closing around a portion of such a rim and a lock mechanism whereby the cuff can be locked in its closed condition. The lock mechanism can be of combination or key-operated type.

Certain specific forms of steering immobiliser according to the invention are represented in FIGS. 1 to 6 of the accompanying drawings, which will now be referred to. In these drawings:

DESCRIPTION OF THE INVENTION

Figure 1:
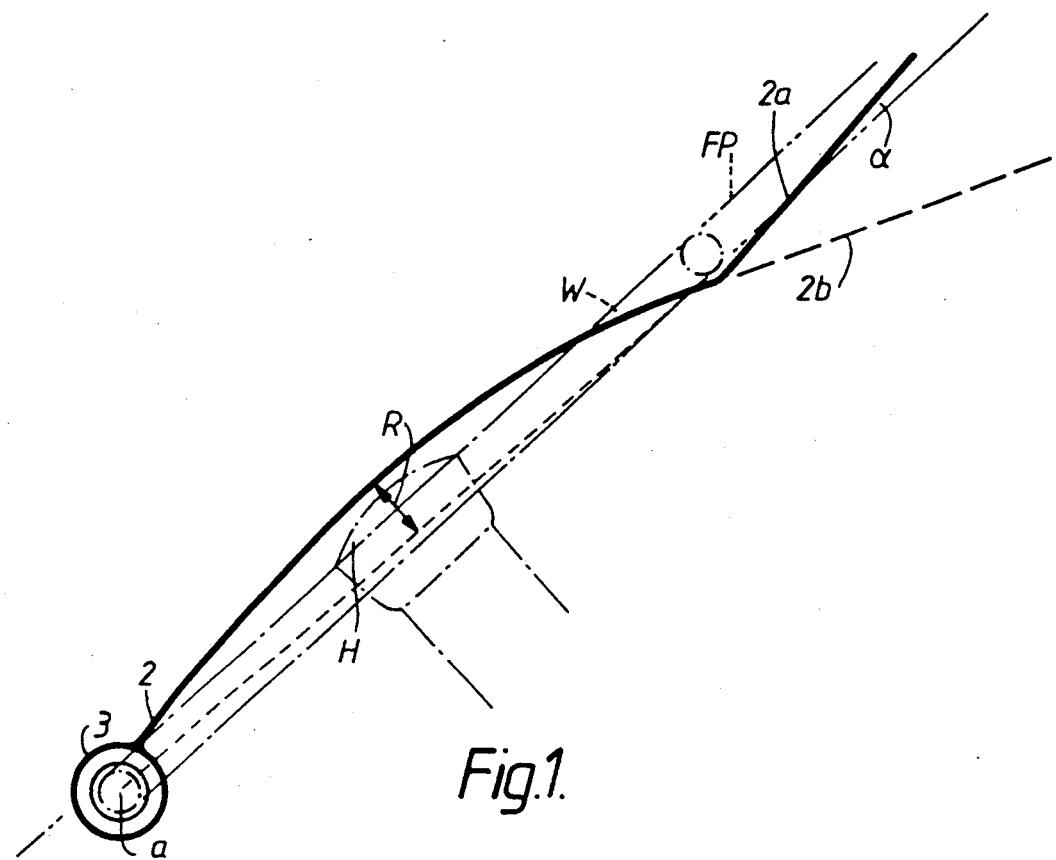
FIG. 1 is a diagrammatic view showing the spatial relationships between the bar and steering wheel.
Figure 4:
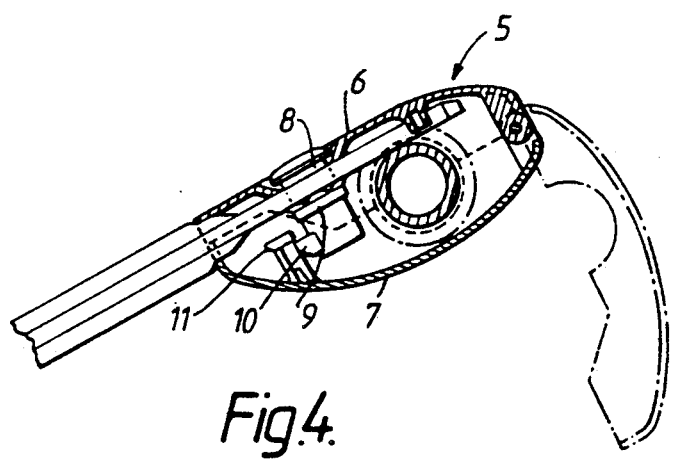
FIG. 4 shows the interior details of the fastening means of that device.
Figure 2:
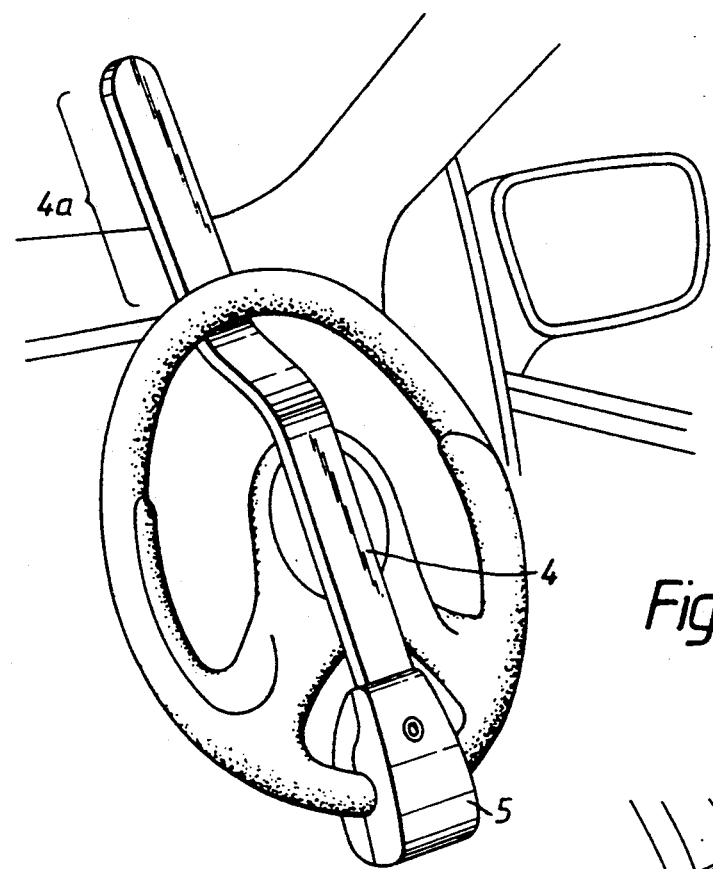
FIGS. 2 and 3 are perspective views of one form of anti-theft device according to the invention, secured to a car steering wheel.
Figure 3:
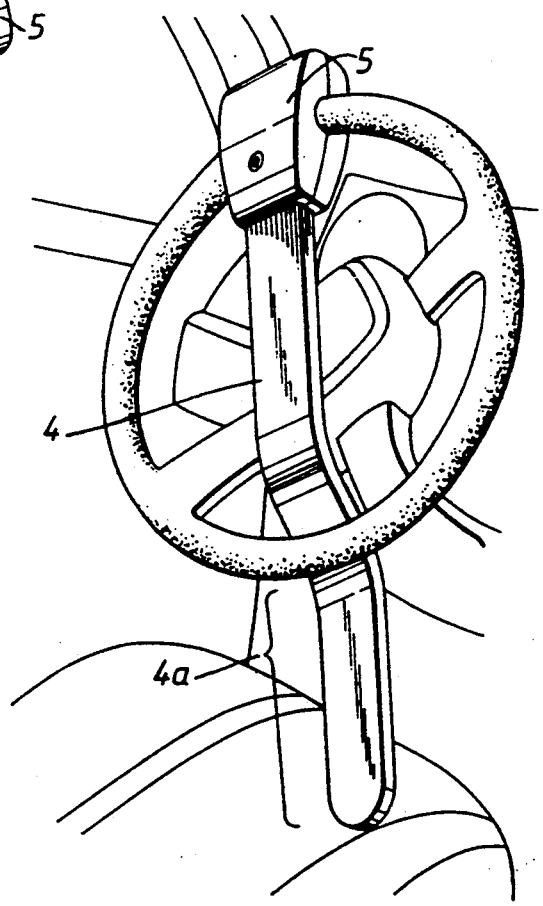

The device shown in FIGS. 2-4 comprises a rigid bar 4 having a fastener 5 secured to one end thereof. The bar is formed by a metal strip which at some distance from the fastener is bent first in one direction and then in the opposite direction in planes normal to the faces of the strip and parallel with its longitudinal axis. The position and extent of the first bend (the bend which is nearer to the fastener) is such that the bar can bridge over the hub portion of a steering wheel and pass through the wheel as shown in FIGS. 2 and 3. The position and extent of the reverse bend is such that a free end portion 4a of the bar projects from behind the steering wheel rim in a plane which is nearly parallel with the plane of that rim. This particular illustrated device has an effective overall length (measured as hereinbefore referred to) of 53 cm. The beginning of the first bend in the bar is approximately 23 cm from the fastener axis; the second bend ends at a position which is within a distance of 38 cm from such axis.

As shown in FIG. 4, the fastening means 5 comprises a base part 6 and a hinged cover 7. The base part 6 is secured to one end of the bar by a lock barrel 8 which extends through an aperture in the barrel, and a nut 9 which is screwed onto the barrel. The lock barrel carries a spring-loaded latching element 10. The cover carries a keeper 11 which projects from the inside face of the cover. The device is fitted by threading the remote end portion of the bar through the steering wheel, positioning the base part of the locking device over the front of the wheel rim and then hinging the cover into closed position over the rear side of the wheel rim so that the rim is enclosed by the locking device. As the cover moves into its closed position the keeper 11 momentarily depresses the latching element 10, which then springs back into its projecting position, behind a collar of the keeper. The cover cannot be opened without a key. In order to remove the device, the key is inserted into the lock barrel from the front face of the base part 6 of the locking device. Turning of the key causes the lock barrel to rotate (against the action of a spring, which is not shown) so that the keeper 11 swings out from beneath the collar of the keeper. The cover can then be hinged open. A torsion spring can be incorporated at the hinge of the cover so that it is biased into its open position.

It is recommended that the metal strip 4 be clad with plastics material.

FIG. 2 shows the bar secured to a car steering wheel with the free end portion of the bar projecting upwardly so that it will prevent steering by abutting against the windscreen or the dashboard or the driver's door, depending on the geometry of the driving compartment of the car. FIG. 3 shows the device secured to a car steering wheel with the free end portion of the bar projecting in a generally downward direction so that it will abut against the driving seat or any person occupying it and attempting to drive the car.

Figure 5:
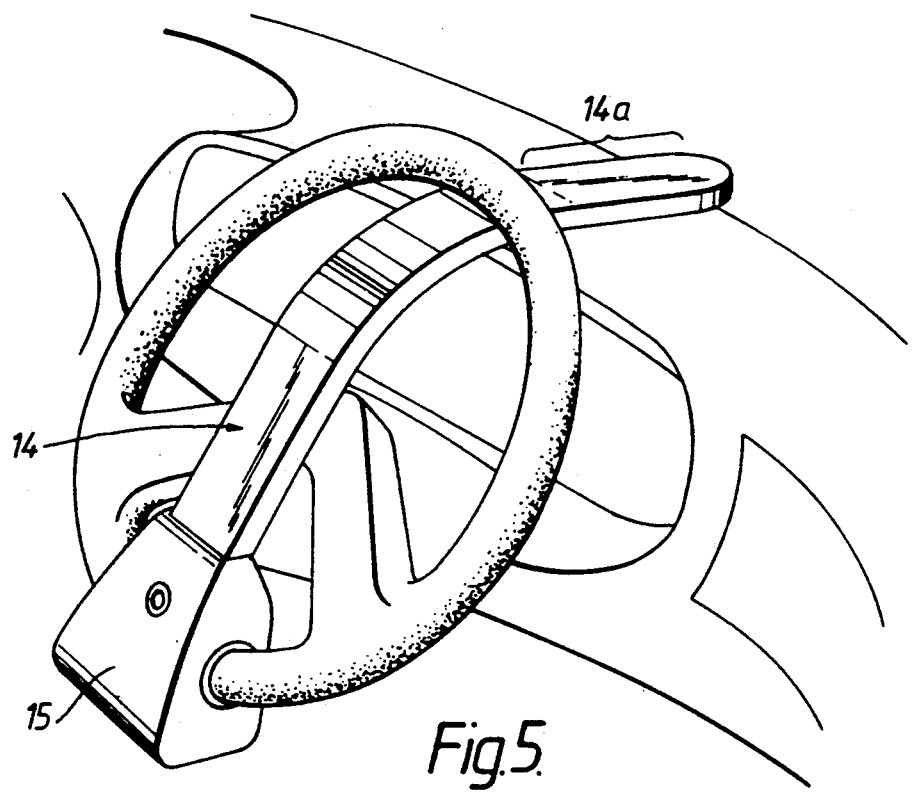
FIG. 5 shows another form of anti-theft device according to the invention, secured to a car steering wheel.
Figure 6:
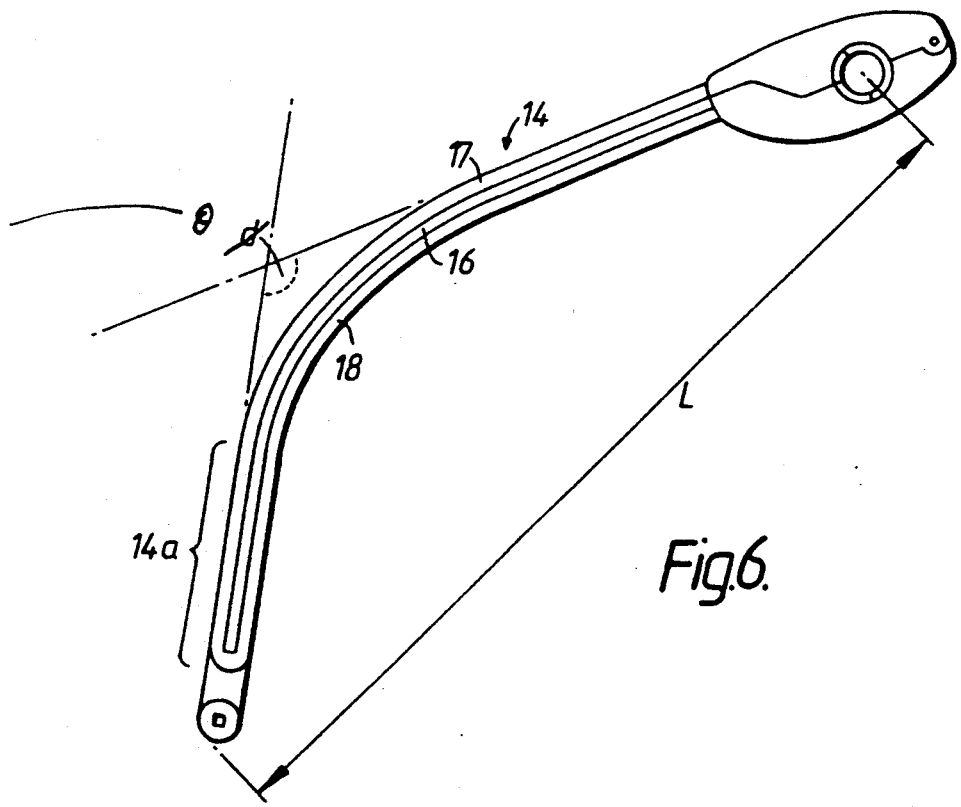
FIG. 6 is a side elevation of the device shown in FIG. 5.

FIGS. 5 and 6 show an anti-theft device according to the invention comprising a bar 14 having a fastening means 15 secured to one end thereof. The bar is constituted by a bent metal strip 16 sandwiched between layers 17, 18 of a plastics material. The fastening means 15 is identical to the fastening means 5 of the anti-theft device shown in FIGS. 2-4. The bar is bent in one direction in planes normal to the top and bottom faces of the bar and parallel with its longitudinal axis. The position and extent of the bend is such that the bar can bridge over the hub portion of a car steering wheel and pass through the wheel as shown in FIG. 5. The device is intended for mounting as shown with the free end portion 14a of the bar projecting over the top of the car instrument panel. For a device intended to be mounted in this manner it has been found to be suitable for the bar to have substantially straight portions joined by a bend, the lengths of those straight portions and the geometry of the bend being as follows;

(i) length of straight portion adjacent the fastener: 23 cm (ii) length of straight free end portion of the bar: 15 cm (iii) geometry of the bend: such that the two straight portions make an included angle (angle $\theta$ in FIG. 6) of 150° and the effective overall length of the device (length "L" in FIG. 6) is 46 cm.

These data are by way of example. They can be varied while still achieving a similar effect. But preferably the said data (i)-(iii) are in any case within the following ranges: (i) from 15 to 30 cm; (ii) from 10 to 25 cm; (iii) angle $\theta$ from 135° to 165° and overall length "L" from 40 to 56 cm.

Variations of the shape of the bar shown in FIGS. 5 and 6 are possible. For example the portions which are shown straight could be curved to some extent.

I claim:

1. An anti-theft device for inhibiting theft of a motor vehicle, of the kind comprising a rigid steering immobiliser bar (2,4,14) having fastening means (3,5,15) by which it can be locked onto a rim of a steering wheel of the vehicle in a position such that a free end portion (2a,2b,4a,14a) of the bar is adapted to project from the wheel to obstruct steering by encounter with a fixed part of the vehicle, and in which the said fastening means (3,5,15) which is lockable to the steering wheel rim, is located at one end only of the said bar (2,4,14); and the bar being so shaped that when its fastening means is so locked to the rim of a steering wheel which has a hub which projects toward a driver of the vehicle, through a front plane (FP) of the steering wheel rim, the bar extends from that fastening means along a path which undergoes directional change such that the bar can bridge over such a projecting steering wheel hub, said path then passing through the wheel at a position beyond that hub, so that a said projecting free end portion (2a,2b,4a,14a) of the bar projects from behind the wheel.

2. An anti-theft device according to claim 1, and in which said fastening means has a through passage for receiving a said steering wheel rim when it is to be locked thereto, said through passage having an axis, and wherein the path followed by a first portion of the bar (2,4,14), extending from the fastening means (3,5,15), is such that it forms a bridge whose central height is at least 3 cm, such height being measured from a straight notional base line extending from the axis of the wheel rim receiving passage through the fastening means to a point on the bar which is at a straight line distance of 36 cm from that axis.

3. An anti-theft device according to claim 2, wherein the path of the bar (2,4) undergoes directional change for forming a said bridge and then undergoes a reverse directional change so that when the anti-theft device is fitted to a steering wheel, the free end portion (2a,4a) of the bar (2,4) is brought nearer to the front plane of the steering wheel rim than would be the case in the absence of such a reverse directional change.

4. An anti-theft device according to claim 3, wherein said free end portion (2a,4a) of the bar (2,4) is substantially straight and said reverse directional change is such that when the device is in position on a steering wheel and a top face of the bar is in contact with the steering wheel rim at a position diametrically opposite to that part of the rim where the fastening means (3,5) is locked, the said free end portion (2a,4a) of the bar makes with the rear plane of the steering wheel rim an included angle $\alpha$ of between 0° and 20°.

5. An anti-theft device according to claim 3, wherein said free end portion (2a,4a) of the bar (2,4) is substantially straight and said reverse directional change is such that when the device is in position on a steering wheel and a top face of the bar is in contact with the steering wheel rim at a position diametrically opposite to that part of the rim where the fastening means (3,5) is locked, the said free end portion of the bar is substantially parallel with the said front plane of the steering wheel rim.

6. An anti-theft device according to claim 2, said device having an effective overall length, measured along a straight line from the axis of the wheel rim receiving passage of the fastener means to an end of the bar which is remote from said axis, of at least 53 cm.

7. An anti-theft device according to claim 1, wherein the bar (14) is shaped so that the anti-theft device can be fitted to a car steering wheel in a position in which it is locked onto a bottom region of the steering wheel rim and the free end portion (2b,14a) of the bar, which projects from behind the wheel rim, projects forwardly towards a windshield of the vehicle and overlaps the top of an instrument panel or dashboard of the vehicle.

8. An anti-theft device according to claim 7, wherein the bar (14) has a first substantially straight portion which extends from the fastening means (15) and has a length of from 15 to 30 cm, a second substantially straight portion which extends up to an end of the bar which is remote from said fastener means, and has a length of from 10 to 25 cm, and a bend between said substantially straight portions such that they make an included angle $\alpha$ of from 135° to 165°, and wherein the device has an effective overall length (L), measured along a straight line from the axis of the wheel rim receiving passage of the fastener means to an end of the bar which is remote from said axis, of from 40 to 56 cm.

* * * * *